(12) United States Patent
Yang et al.

(10) Patent No.: US 11,127,374 B2
(45) Date of Patent: Sep. 21, 2021

(54) BIDIRECTIONAL DISPLAY DEVICE AND METHOD OF CONTROLLING SAME

(71) Applicant: Electronics and Telecommunications Research Institute, Daejeon (KR)

(72) Inventors: Ung Yeon Yang, Daejeon (KR); Ki Hong Kim, Sejong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/446,175

(22) Filed: Jun. 19, 2019

(65) Prior Publication Data
US 2019/0392783 A1    Dec. 26, 2019

(30) Foreign Application Priority Data

Jun. 20, 2018   (KR) .......................... 10-2018-0070918

(51) Int. Cl.
| | |
|---|---|
| *G09G 5/02* | (2006.01) |
| *G09G 5/14* | (2006.01) |
| *F21V 8/00* | (2006.01) |
| *G09G 3/34* | (2006.01) |
| *G06F 3/01* | (2006.01) |
| *G09G 5/373* | (2006.01) |

(Continued)

(52) U.S. Cl.
CPC .............. *G09G 5/14* (2013.01); *G02B 6/0068* (2013.01); *G02B 6/0076* (2013.01); *G06F 3/013* (2013.01); *G09G 3/342* (2013.01); *G09G 5/373* (2013.01); *G09G 5/38* (2013.01); *G09G 2354/00* (2013.01); *G09G 2360/04* (2013.01); *G09G 2360/145* (2013.01); *H04N 5/247* (2013.01)

(58) Field of Classification Search
CPC ...... G09G 5/14; G02B 6/0068; G02B 6/0076; G06F 3/013
USPC ......................................................... 345/694
See application file for complete search history.

(56) References Cited

U.S. PATENT DOCUMENTS

| | | | |
|---|---|---|---|
| 2005/0062913 A1 * | 3/2005 | Choi | .................... G02B 6/0063 349/114 |
| 2008/0144175 A1 | 6/2008 | Simonsen | |

(Continued)

FOREIGN PATENT DOCUMENTS

KR     1020120054507 A     5/2012

*Primary Examiner* — Jonathan M Blancha
(74) *Attorney, Agent, or Firm* — William Park & Associates Ltd

(57) ABSTRACT

A bidirectional display device may include: a first transparent display panel outputting a first image in a first direction and transmitting light reflected in a second direction that is an opposite direction of the first direction; a first transparent light panel disposed behind the first transparent display panel and providing light to the first transparent display panel; a transmittance control panel disposed behind the first transparent light panel; a second transparent display panel outputting a second image in the second direction and transmitting light reflected in the first direction; a second transparent light panel disposed between the transmittance control panel and the second transparent display panel and providing light to the second transparent display panel; a transmittance controller and controlling transmittance of at least one object included in the first image or the second image; and an image output controller controlling output of the first image and the second image.

17 Claims, 14 Drawing Sheets

(51) Int. Cl.
    *H04N 5/247*     (2006.01)
    *G09G 5/38*     (2006.01)

(56)     References Cited

U.S. PATENT DOCUMENTS

| | | | |
|---|---|---|---|
| 2010/0220261 A1* | 9/2010 | Mizushima | G02B 6/0035 349/64 |
| 2012/0154441 A1 | 6/2012 | Kim | |
| 2012/0229422 A1* | 9/2012 | Hwang | G02B 6/0073 345/175 |
| 2014/0049983 A1* | 2/2014 | Nichol | G02B 6/0028 362/610 |
| 2015/0204687 A1 | 7/2015 | Yoon et al. | |
| 2018/0217429 A1* | 8/2018 | Busch | G02F 1/076 |

\* cited by examiner

FIG.3
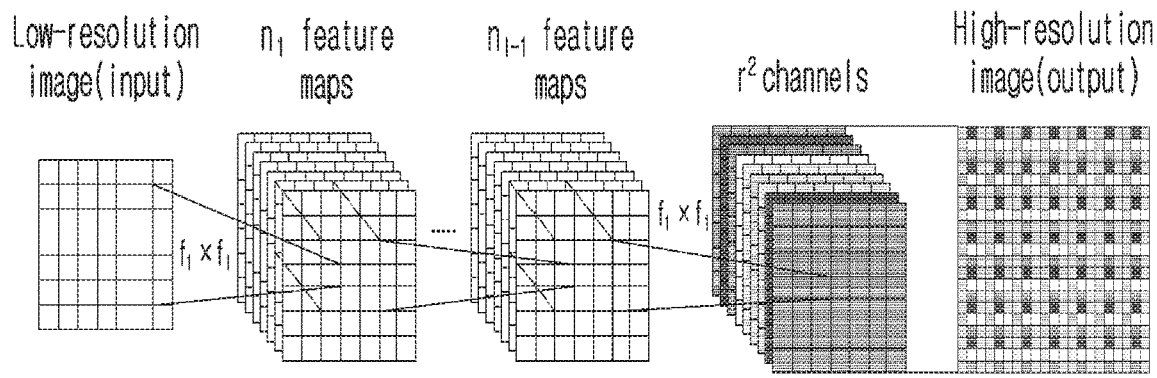
CONFIGURATION OF RESOLUTION BY MULTI-LAYERING METHOD (SUB-PIXEL CONVOLUTION)
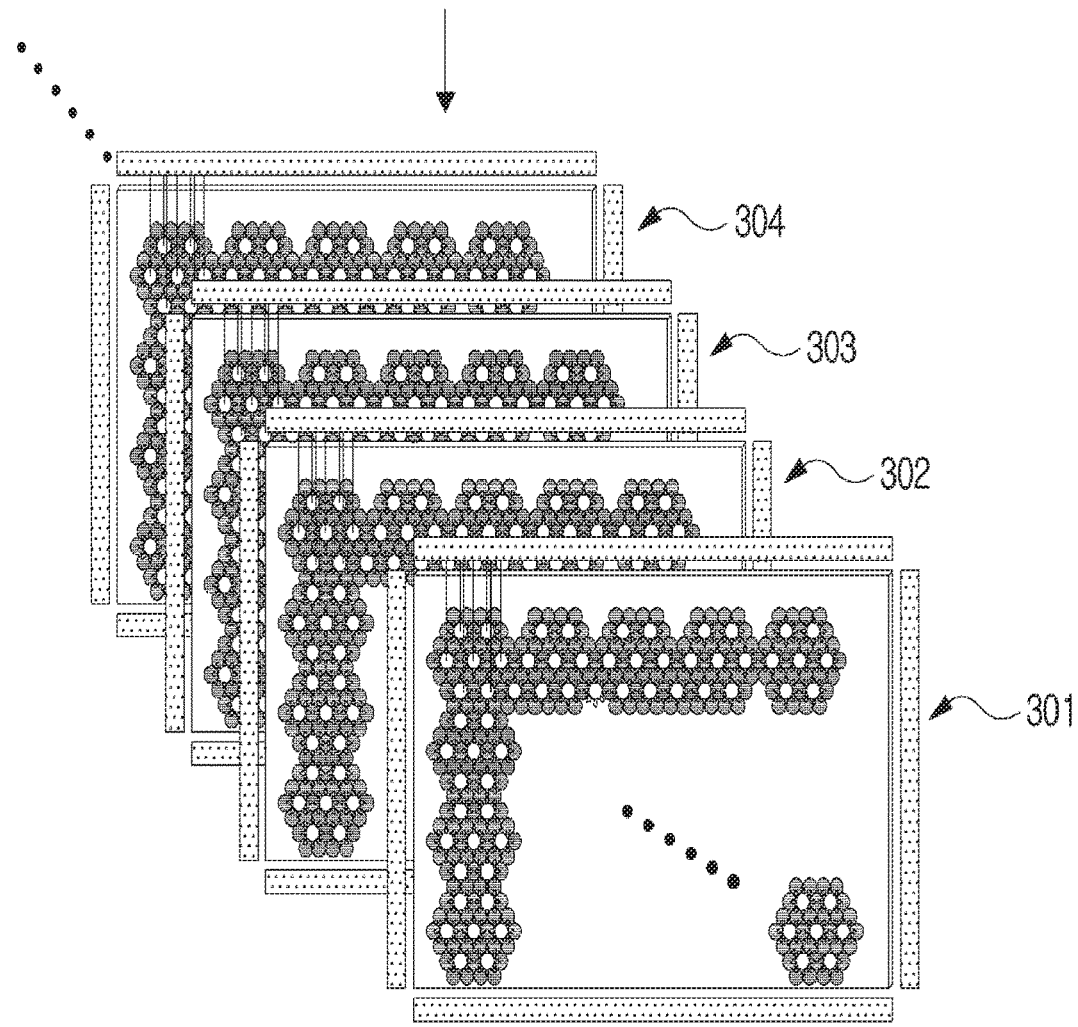

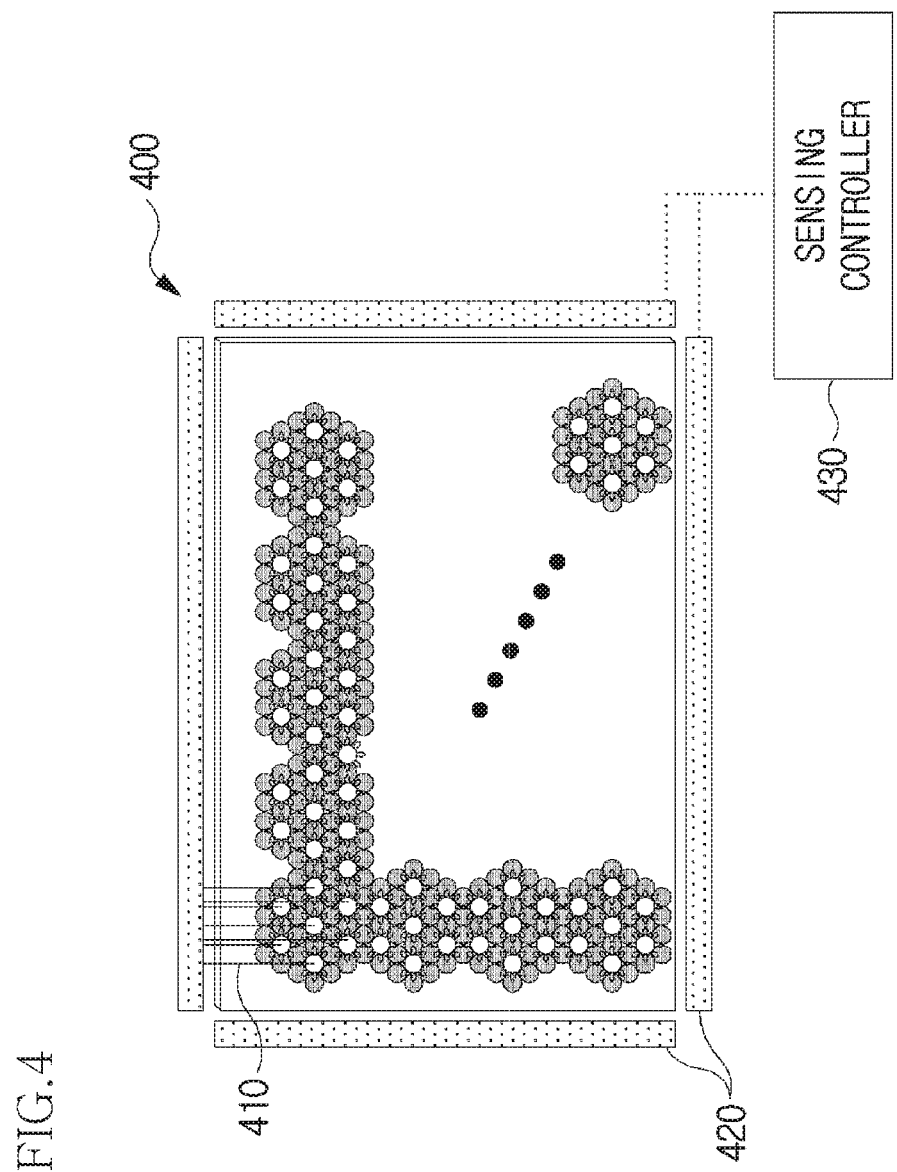

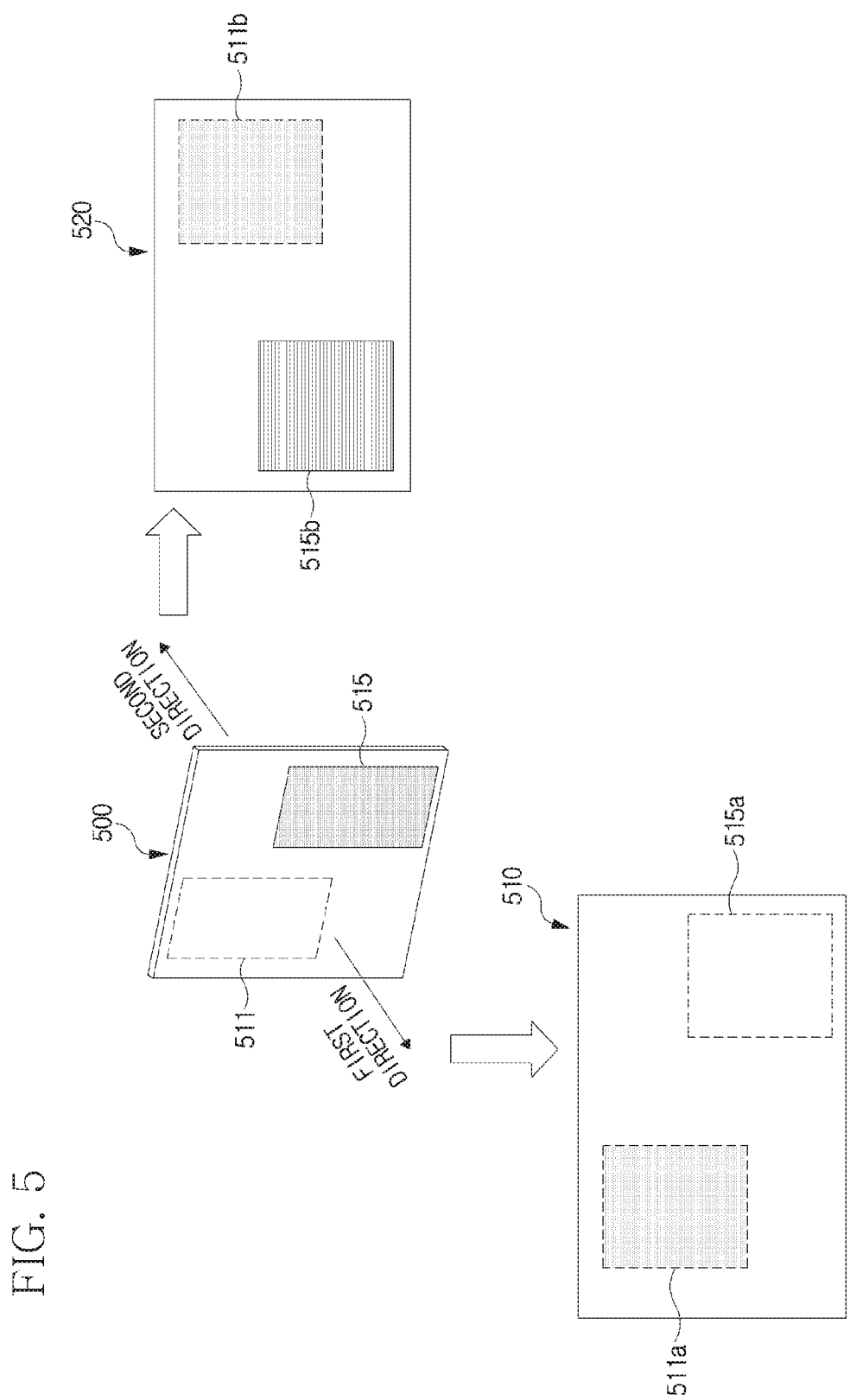

BIDIRECTIONAL DISPLAY DEVICE AND METHOD OF CONTROLLING SAME

CROSS REFERENCE TO RELATED APPLICATION

The present application claims priority to Korean Patent Application No. 10-2018-0070918, filed on Jun. 20, 2018, the entire contents of which is incorporated herein for all purposes by this reference.

BACKGROUND OF THE INVENTION

Field of the Invention

The present disclosure relates to a display device and, more particularly, to a transparent display device that can output images in two directions, and a method of controlling the transparent display device.

Description of the Related Art

Various types of flat panel display devices that can reduce weight and volume that are defects of a cathode ray tube have been developed. As flat panel display devices, there are a liquid crystal display device, a plasma display panel, a field emission display device, a light emitting display device, etc.

In particular, a liquid crystal display device is widely used as the display device of not only a television or a monitor, but also a notebook computer, a tablet computer, or various portable information devices. The liquid crystal display device is not a self-lighting device, so a backlight unit is disposed under a liquid crystal display panel to display images using light from the backlight unit. Light emitting diodes are generally used as light sources of the backlight unit.

Recently, a solid-state OLED display device is in the spotlight as an excellent flat panel display technology. However, the OLED display device is difficult to manufacture in a large size and has a limit in transmittance.

SUMMARY OF THE INVENTION

As contents and display devices have been developed, there is a demand for a display device that enables users to freely express predetermined information while seeing each other eye to eye. For example, there is a demand for a device that enables a doctor and a patient to express information about health while facing each other at a place such as a hospital or enables several participants to express information about a conference at a place such as conference room.

However, the related art has a problem that it is impossible to simultaneously link and output sharing contents for a multi-user environment in a space between users or users cannot freely process desired input.

An object of the present disclosure is to provide a bidirectional display device that can output predetermined contents to users while transmitting and displaying light reflected by subjects existing in an opposite direction, and a method of controlling the bidirectional display device.

Another object of the present disclosure is to provide a bidirectional display device that is arranged in various directions to enable a plurality of users to use the device while seeing each other, and a method of controlling the bidirectional display device.

Another object of the present disclosure is to provide a bidirectional display device that can control contents by reflecting an arrangement state thereof, or user's gaze or input, and a method of controlling the bidirectional display device.

The technical subjects to implement in the present disclosure are not limited to the technical problems described above and other technical subjects that are not stated herein will be clearly understood by those skilled in the art from the following specifications.

According to an aspect of the present disclosure, a bidirectional display device can be provided. The bidirectional display device may include: a first transparent display panel outputting a first image in a first direction and transmitting light reflected in a second direction that is an opposite direction of the first direction; a first transparent light panel disposed behind the first transparent display panel and providing light to the first transparent display panel; a transmittance control panel disposed behind the first transparent light panel; a second transparent display panel outputting a second image in the second direction and transmitting light reflected in the first direction; a second transparent light panel disposed between the transmittance control panel and the second transparent display panel and providing light to the second transparent display panel; a transmittance controller connected to the transmittance control panel and controlling transmittance of at least one object included in the first image or the second image; and an image output controller controlling output of the first image and the second image.

According to another aspect of the present disclosure, a method of controlling a bidirectional display device can be provided. The method of controlling a bidirectional display device includes: outputting a first image in a first direction through a first transparent display panel transmitting light reflected in a second direction that is an opposite direction of the first direction, and outputting light in the first direction through a first transparent light panel disposed behind the first transparent display panel; outputting a second image in the second direction through a second transparent display panel transmitting light reflected in the first direction, and outputting light in the second direction through a second transparent light panel disposed behind the second transparent display panel; and determining the kind of an object included in the first image or the second image and controlling transmittance of a transmittance control panel disposed between the first and second transparent light panels in response to the kind of the object.

The features briefly provided above in connection with the present disclosure are just examples for describing the present disclosure and do not limit the scope of the present disclosure.

According to the present disclosure, it is possible to provide a bidirectional display device that can output predetermined contents to users while transmitting and displaying light reflected by subjects existing in an opposite direction, and a method of controlling the bidirectional display device.

According to the present disclosure, it is possible to provide a bidirectional display device that is arranged in various directions to enable a plurality of users to use the device while seeing each other, and a method of controlling the bidirectional display device.

According to the present disclosure, it is possible to provide a bidirectional display device that can control contents by reflecting an arrangement state thereof, or user's gaze or input, and a method of controlling the bidirectional display device.

The effects of the present disclosure are not limited to the effects described above and other effects can be clearly understood by those skilled in the art from the following description.

BRIEF DESCRIPTION OF THE DRAWINGS

The above and other objects, features and other advantages of the present invention will be more clearly understood from the following detailed description when taken in conjunction with the accompanying drawings, in which:

FIG. 3 is a view exemplifying the structure of the first transparent light panel of the bidirectional display device according to an embodiment of the present disclosure;

FIG. 4 is a view showing the configuration of an object detector of the bidirectional display device according to an embodiment of the present disclosure;

FIG. 5 is a view exemplifying the operation of a transmittance control panel of the bidirectional display device according to an embodiment of the present disclosure;

DETAILED DESCRIPTION OF THE INVENTION

Figure 1:
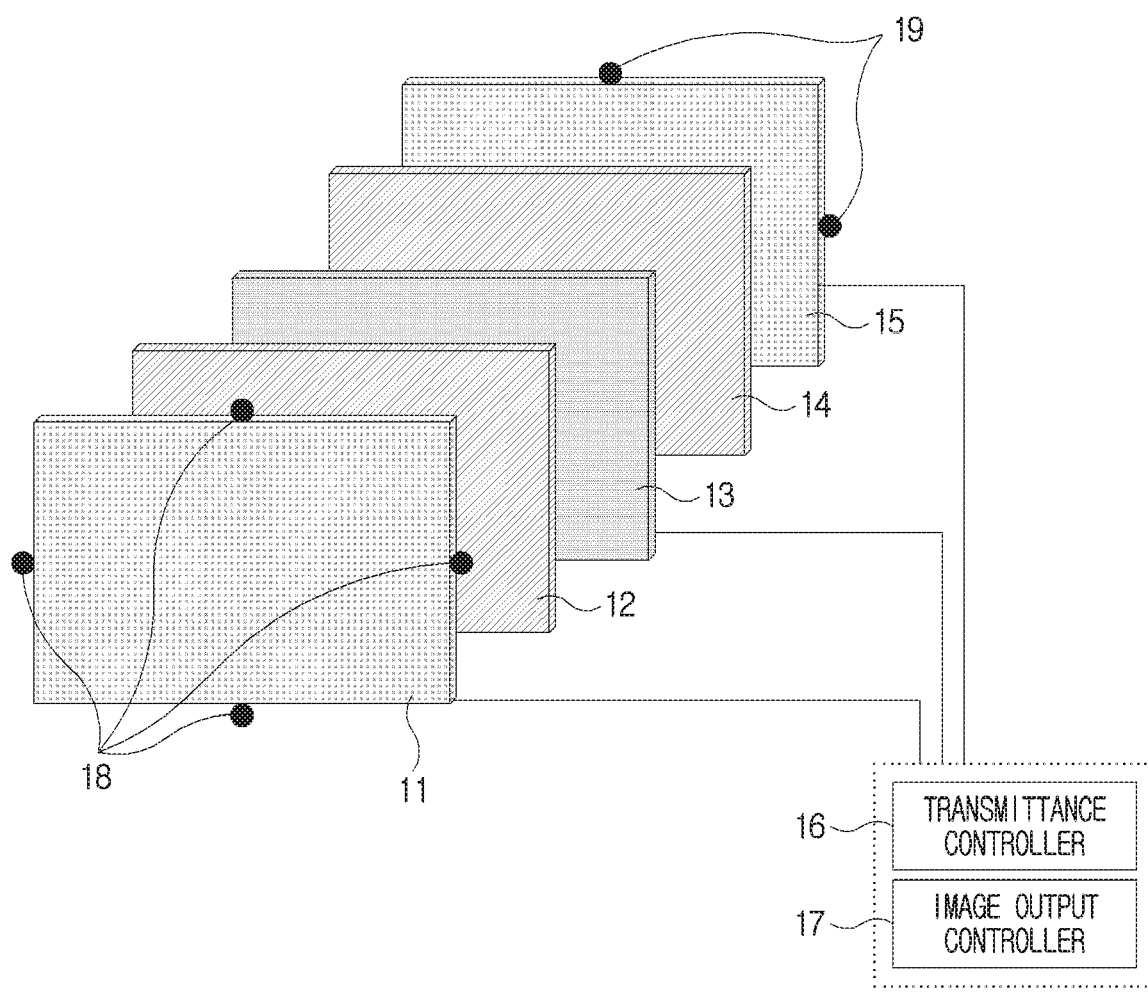
FIG. 1 is a view showing the configuration of a bidirectional display device according to an embodiment of the present disclosure.

Hereinbelow, exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinafter, embodiments of the present disclosure will be described with reference to the accompanying drawings.

FIG. 1 is a view showing the configuration of a bidirectional display device according to an embodiment of the present disclosure.

A bidirectional display device according to an embodiment of the present disclosure may include a first transparent display panel 11, a first transparent light panel 12, a transmittance control panel 13, a second transparent light panel 14, a second transparent display panel 15, a transmittance controller 16, and an image output controller 17.

The first transparent display panel 11, the first transparent light panel 12, the transmittance control panel 13, the second transparent light panel 14, and the second transparent display panel 15 may be sequentially arranged, and the first transparent display panel 11 and the first transparent light panel 12 are provided as a set and arranged to output images or light in a first direction. The second transparent light panel 14 and the second transparent display panel 15 are also provided as a set and arranged to output images or light in a second direction. The first direction and the second direction may be opposite directions to each other.

The first transparent display panel 11, the first transparent light panel 12, the second transparent light panel 14, and the second transparent display panel 15 may be connected to the image output controller 17 and their output may be controlled by at least one control signal from the image output controller 17.

The first transparent display panel 11 can output a first image in the first direction and the second transparent display panel 15 can output a second image in the second direction, in which the first image and the second image may be the same images.

The first transparent display panel 11 and the second transparent display panel 15 may have transparent light emitting elements and can output images corresponding to at least one control signal from the image output controller 17. On the basis of this configuration, the first transparent display panel 11 can transmit and provide light, which is reflected by objects existing in the second direction, in the first direction while outputting a first image in the first direction. Accordingly, a user can check objects existing behind the first transparent display panel 11 while watching the first image. Similarly, the second transparent display panel 15 can transmit and provide light, which is reflected by objects existing in the first direction, in the second direction while outputting a second image in the second direction. Accordingly, a user can check objects existing behind the second transparent display panel 15 while watching the second image.

The first transparent light panel 12 is disposed behind the first transparent display panel 11 and can output light corresponding to a first image displayed on the first transparent display panel 11. Similarly, the second transparent light panel 14 is disposed behind the second transparent display panel 15 and can output light corresponding to a second image displayed on the second transparent display panel 15.

The transmittance control panel 13 may be disposed between the first transparent light panel 12 and the second transparent light panel 14 and can control the transmittance of images that are output through the first transparent display panel 11 and the second transparent display panel 15. The transmittance control panel 13 may be connected to the transmittance controller 16 and the transmittance can be controlled in response to a control signal from the transmittance controller 16.

The transmittance controller 16 can generate a control signal for controlling the transmittance of at least one object included in the first image or the second image.

The transmittance controller 16 can determine the kinds of objects included in the first and second images and can determine transmittance corresponding to the kinds of the objects in consideration of the kinds of the output objects. The transmittance controller 16 can generate a control signal for controlling the transmittance of areas where the objects exist to fit the determined transmittance.

For example, the transmittance controller 16 can determine that the kinds of objects included in the first and second image are documents, and can control the transmittance of the areas where the objects exist as "0" in accordance with the position and size information of the areas where the objects exist and the kinds of the objects.

When the transmittance controller 16 sets transmittance as "0", light reflected by objects existing in corresponding areas may not be transmitted, and when transmittance is set as "100", light reflected by objects existing in corresponding areas may be fully transmitted.

The image output controller 17 can generate image control signals for controlling output of the first image and the second image and can provide the image control signals to the first transparent display panel 11 and the first transparent light panel 12. The image output controller 17 can provide optical control signals for controlling optical signals corresponding to the first image and the second image to the first transparent light panel 12 and the second transparent light panel 14.

The image output controller 17 can determine the kinds of objects included in the first image and the second image and can generate a control signal for controlling output of the areas where the objects exist.

For example, the image output controller 17 can determine that the kinds of objects included in the first and second image are documents, and can provide the position and size information of the areas where the objects exist and the kinds of the objects to the transmittance control panel. Since the kinds of the objects included in the first and second images are documents, the image output controller 17 can control the objects included in the first and second images to be switched.

For example, the image output controller 17 can determine that the kinds of objects included in the first and second image are security documents, and can provide the position and size information of the areas where the objects exist and the kinds of the objects to the transmittance control panel. Since the kinds of the objects included in the first and second images are security documents, the image output controller 17 can control the objects to be output in one of the first and second images under certain restrictions.

The bidirectional display device according to an embodiment of the present disclosure may further include at least one first image sensor 18 that photographs in the first direction and at least one second image sensor 19 that photographs in the second direction.

A first photographed image and a second photographed image that are taken through least one first image sensor 18 and the at least one second image sensor 19, respectively, can be provided to the image output unit 17, and the image output unit 17 can control output of the first image and the second image by analyzing the first photographed image and the second photographed image.

For example, the image output unit 17 can track a user's gaze from the first photographed image and the second photographed image and can reconstruct the first image and the second image by reflecting the direction of the user's gaze. In detail, the image output unit 17 can determine parameters (e.g., the photographing direction of a camera device, the resolution of a camera device, the focal distance of a subject, and depth information) related to the photographing environment of the first image, and can reconstruct the first image by re-projecting the image on the basis of geometrical information between the image and the parameters related to the photographing environment. The image output unit 17 can determine the photographing environment of the first photographed image and reconstruct the first image to correspond to the user's gaze. Virtual camera view interpolation based on a multi view may be used for reconstruction of a first image.

Similarly, the image output unit 17 can reconstruct and provide the second image in consideration of the photographing environment of the second photographed image and the user's gaze.

Figure 2:
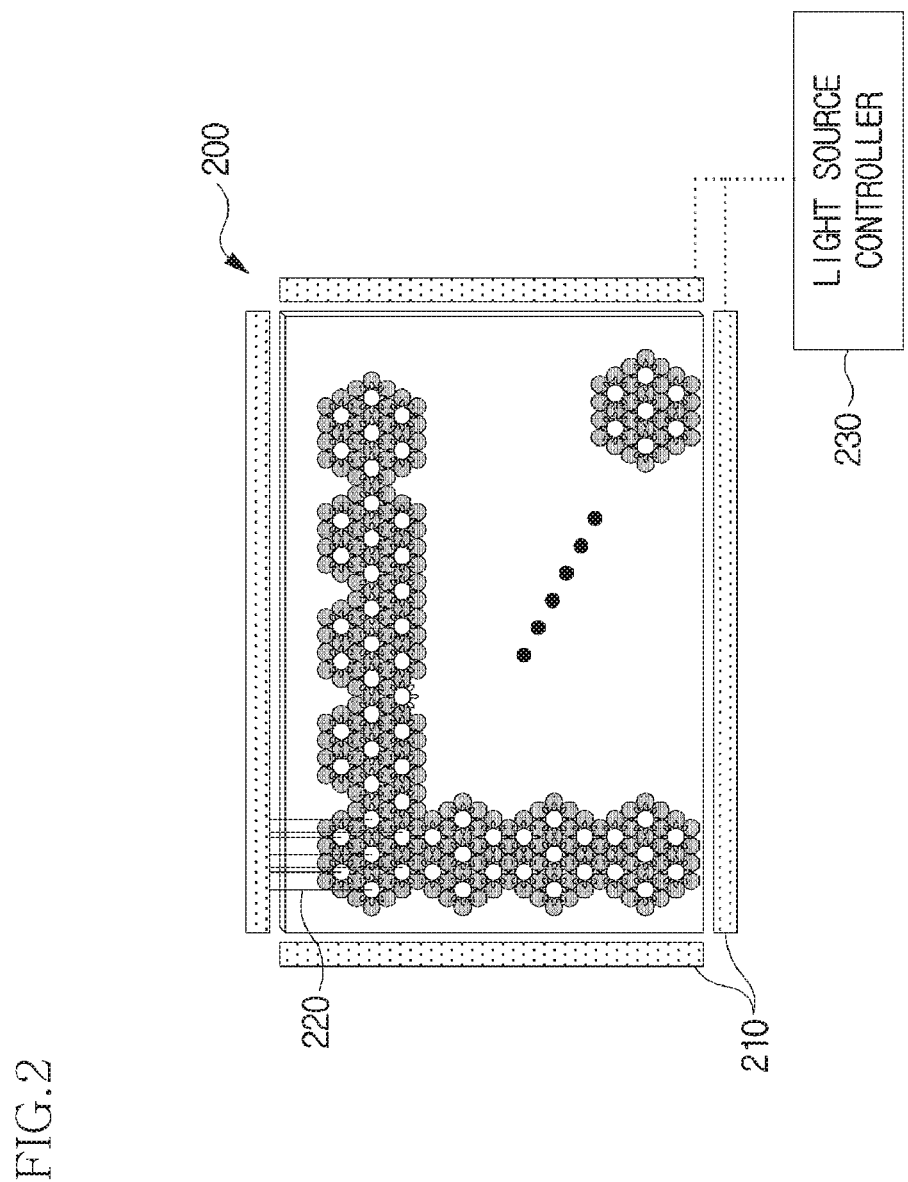
FIG. 2 is a view showing the configuration of a first transparent light panel of the bidirectional display device according to an embodiment of the present disclosure.
Figure 6A:
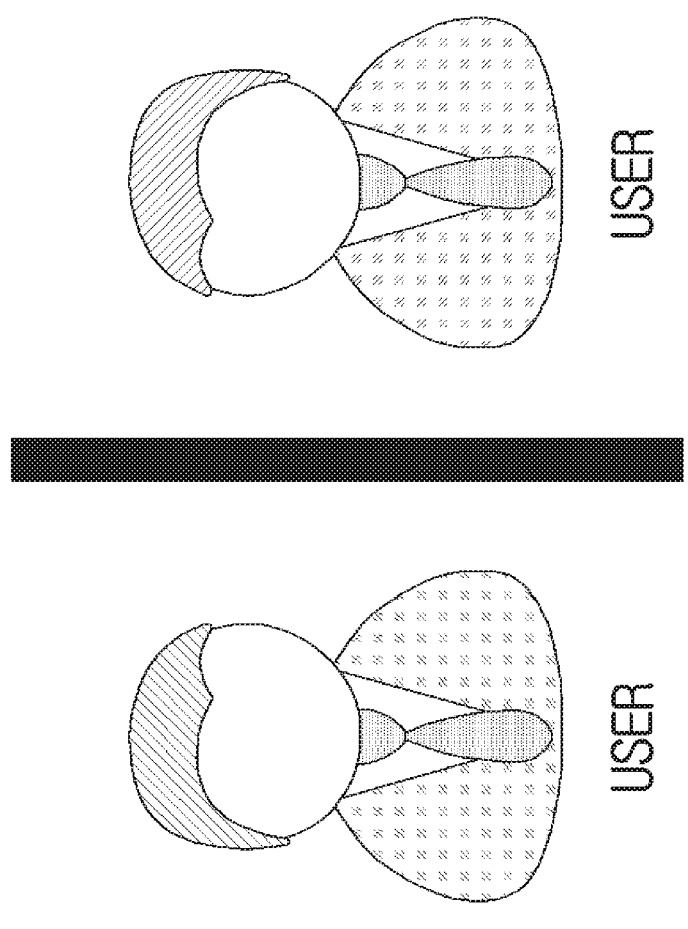
FIGS. 6A to 6E are views showing arrangement of the bidirectional display devices according to an embodiment of the present disclosure.
Figure 6B:
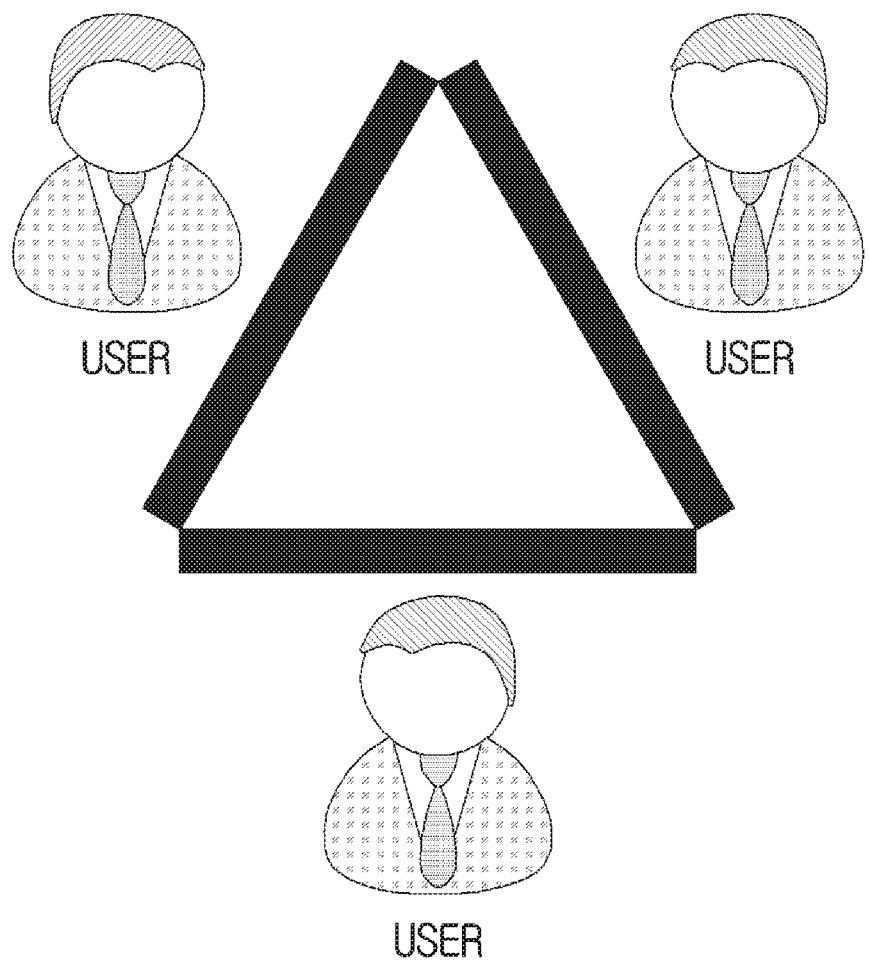
Figure 6C:
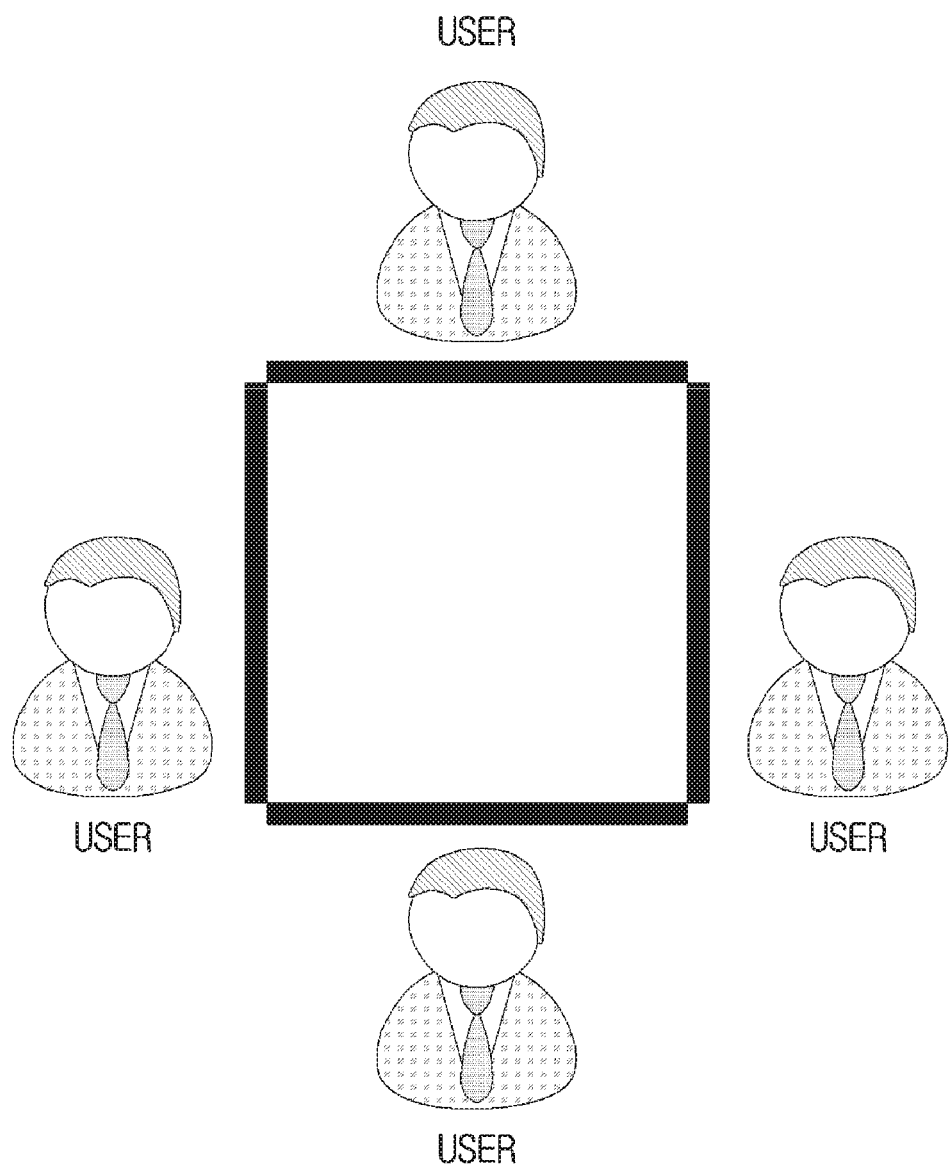
Figure 6D:
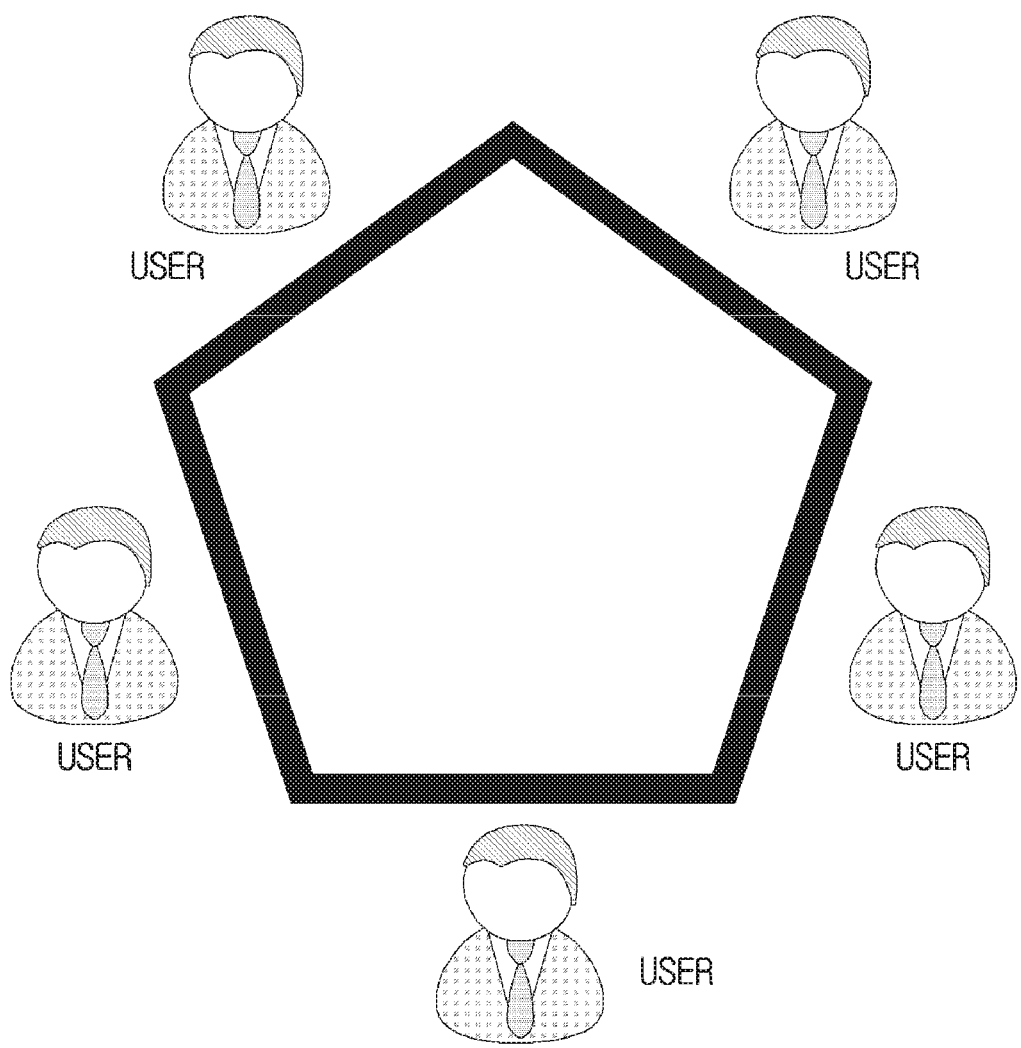
Figure 6E:
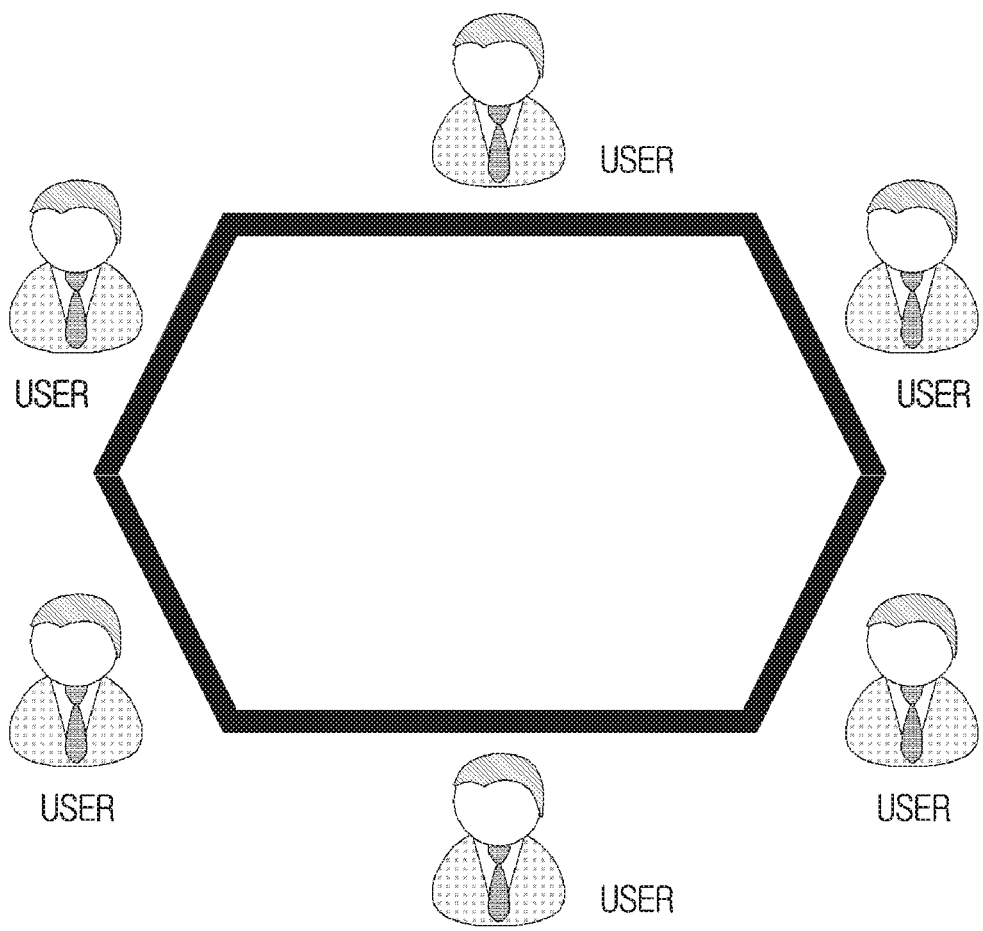

FIG. 2 is a view showing the configuration of a first transparent light panel of the bidirectional display device according to an embodiment of the present disclosure.

A first transparent light panel and a second transparent light panel may have the same configuration and structure. Hereafter, the configuration and structure of the first transparent light panel is described in an embodiment of the present disclosure and are referred to for the configuration and structure of the second transparent light panel.

The first transparent light panel 200 may include a plurality of light sources 210, a light emission waveguide 220, and a light source controller 230.

The light sources 210 are disposed at corners of the first transparent light panel 200 and may include light emitting elements that output predetermined light.

The light emission waveguide 220 may have a structure that delivers light from the light sources 210 to areas corresponding to pixel units of the first transparent display panel 11. The light emission waveguide 220 may transmit and provide light, which is reflected by objects existing in the second direction, in the first direction while delivering light to the areas corresponding to the pixel units of the first transparent display panel 11. For example, the light emission waveguide 220 may include optical fiber connected to the light sources and the pixel units of the first transparent display panel 11 and can transmit and provide light, which is reflected by objects existing in the second direction, in the first direction.

The light source controller 230 can determine areas to be lighted, that is, the areas corresponding to the pixel units of the first transparent display panel 11 on the basis of the light sources 210 and the light emission waveguide 220 and can control operation, for example, ON/OFF of the light sources 210 to emit light to the areas.

The first transparent light panel 200 may have a structure in which a plurality of sub-panels is layered.

For example, referring to FIG. 3, the first transparent light panel 200 may include a first sub-panel 301 in which the light sources 210 and the light emission waveguide configure predetermined first resolution, and at least one second sub-panel 302, 303, 304, . . . that configures the predetermined first resolution and of which positions of the predetermined cell units are adjusted on the basis of a multi-layering method. Since the positions of the predetermined cell units of the first sub-panel 301 and the second sub-panels 302, 303, 304, . . . are adjusted on the basis of the multi-layering method, the first transparent light panel 200 may have second resolution higher than the predetermined first resolution. The second resolution may be set to be the same as the resolution of the first transparent display panel 11.

On the basis of the structure of the first sub-panel 301 and the second sub-panels 302, 303, 304, . . . layered by the multi-layering method in the first transparent light panel 200, the light source controller 230 can control operation, for example, ON/OFF of a plurality of light sources included in the first sub-panel 301 and the second sub-panels 302, 303, 304, . . . .

The bidirectional display device can detect objects close to the device. To this end, the first transparent light panel 200 may further include an object detector that detects objects close to the device. The configuration and operation of the object detector are described hereafter with reference to FIG. 4.

FIG. 4 is a view showing the configuration of an object detector of the bidirectional display device according to an embodiment of the present disclosure.

The object detector may be disposed on the first transparent light panel 200, and the description of FIG. 2 is referred to for the components 210, 220, and 230 of the first transparent light panel 200.

First, an object detector 400 according to an embodiment of the present disclosure may include a plurality of light reception waveguides 410, a plurality of light reception elements 420, and a sensing controller 430.

The light reception waveguides 410 may have first ends arranged and fixed with predetermined gaps on the first transparent light panel 200 and second ends connected to the areas where the light reception elements 420 are positioned. Accordingly, the light reception waveguides 410 can form light transmission paths from the first transparent light panel 200 to the light reception elements 420.

For example, the first ends of the light reception waveguides 410 may be disposed on the first transparent light panel 200 on the basis of predetermined resolution. The resolution at the first ends of the light reception waveguides 410 may be lower than the resolution of the light emission waveguide 220.

The light reception waveguides 410 may transmit and provide light, which is reflected by objects existing in the second direction, in the first direction. For example, the light emission waveguide 410 may include optical fiber connected from pixels of the first transparent display panel to the light reception elements 420 and the optical fiber can transmit and provide light, which is reflected by objects existing in the second direction, in the first direction.

The light reception elements 420 are disposed at the corners of the first transparent light panel 200 and may include light reception elements that detect the intensity of light that is delivered through the light reception waveguides 410.

The light reception waveguides 410 and the light reception elements 420 may be provided by a number corresponding to predetermined resolution.

The sensing controller 430 is connected to the light reception elements 420 and can determine the intensity of light input through the light reception elements 420. The sensing controller 430 can check whether an object approaches, in consideration of the arrangement positions of the light reception waveguides 410 connected to the light reception elements 420.

For example, when an object approaches the first transparent light panel 200, light output through the light emission waveguide 220 may be reflected by the object and the reflected light may travel into a light reception waveguide 410. As the light travels into the light reception waveguide 410, the intensity of the light traveling inside through a light reception element 420 may be delivered to the sensing controller 430. Accordingly, the sensing controller 430 can determine the intensity of the light detected through the light reception element 420 and can determine the arrangement position of the light reception waveguide 410 connected with the light reception element 420. Therefore, the sensing controller 430 can determine that an object has approached an area corresponding to the arrangement position of the light reception waveguide 410, and can estimate the distance from the object on the basis of the intensity of the detected light.

The operation of the light sources 210 can be controlled by the light source controller 230, and the intensity of light that is output through the light emission waveguide 220 can be changed by the operation of the light sources 210. The intensity of light that is detected through the light reception elements 420 can be changed by the intensity of light that is output from the light emission waveguide 220 disposed close to the light reception waveguides 410.

In consideration of this fact, the sensing controller 430 can determine a light source control signal that is provided to the light sources 210 from the light source controller 230.

The sensing controller 430 can determine whether an object approaches and can calculate the distance from the object generally in consideration of the connection relationship between the light reception waveguides 410 and the light reception elements 420, the arrangement positions of the light reception waveguides 410, the connection relationship between the light emission waveguide 220 and the light sources 210, the arrangement position of the light emission waveguide 220, the light source control signal from the light source controller 230, etc.

As described above with reference to FIG. 3, the first transparent light panel 200 may be formed by combining a plurality of sub-panels. Accordingly, the light reception waveguides 410 and the light reception elements 420 may be disposed on the sub-panels on the basis of predetermined resolution and the sensing controller 430 can determine whether an object approaches and can calculate the distance from the object on the basis of the positions and arrangement relationship of the light reception waveguides 410 and the light reception elements 420 disposed on the sub-panels.

FIG. 5 is a view exemplifying the operation of a transmittance control panel of the bidirectional display device according to an embodiment of the present disclosure and images that are output through the bidirectional display device.

A transmittance control panel 500 can control transmittance of images 510 and 520 that are output through the first transparent display panel and the second transparent display panel.

The transmittance of the transmittance control panel 500 can be controlled by the transmittance controller and the transmittance controller can control the transmittance in consideration of the kinds of objects included in the first image 510 that is output in the first direction and the second image 520 that is output in the second direction.

For example, first objects 511*a* and 511*b* and second objects 515*a* and 515*b* may exist in the first image 510 and the second image 520, the kind of the first objects 511*a* and 511*b* may be media (e.g., an MRI or CT image), and the kind of the second objects 515*a* and 515*b* may be a document.

In consideration of this fact, the transmittance controller can determine an area 511 where the first objects 511*a* and 511*b* exists in the transmittance control panel 500, and can set transmittance of the area 511 as "100". Further, the transmittance controller can determine an area 515 where the second objects 515*a* and 515*b* exists in the transmittance control panel 500, and can set transmittance of the area 515 as "0".

Accordingly, the first objects 511*a* and 511*b* that are shown to be transparent may be output respectively in the first image 510 output in the first direction and the second image 520 output in the second direction. Since the areas 515 where the second objects exist are shown to be opaque by the transmittance control panel 500, the second object 515*a* may not be displayed in the first image 510 output in the first direction and the second object 515*b* may be displayed only in the second image 520 output in the second direction. Meanwhile, the bidirectional display device is transparent, so a plurality of users can use images, which are output by the bidirectional display device, at various positions. For example, the bidirectional display device can be arranged in various ways in consideration of the number of the devices or users arranged, as exemplified in FIGS. 6A to 6E.

The bidirectional display device is required to control display of images or objects to be output in consideration of the arrangement position. To this end, the bidirectional display device according to an embodiment of the present disclosure can determine spatial arrangement and control images to be output in consideration of the spatial arrangement.

In particular, the image output controller 17 of the bidirectional display device may include a posture determiner that determines the posture of the device.

The posture determiner can determine position (e.g., X, Y, and Z coordinates) and posture (e.g., pitch, yaw, and roll inclination) information of the bidirectional display device in a 3D space.

The posture determiner can support wireless communication and can exchange position information and posture information by communicating with a posture determiner of another bidirectional display device.

The posture determiner can determine arrangement of the bidirectional display device in a 3D space in consideration of the position information and posture information thereof and the position information and posture information of adjacent bidirectional display devices. The posture determiner can provide arrangement in a 3D space. In response to this, the image output controller 17 can control images to be output in consideration of arrangement of the bidirectional display device in a 3D space.

For example, the image output controller 17 can control the positions or sizes of objects to be displayed in images in consideration of arrangement of the bidirectional display device in a 3D space.

When an object included in an image is a document, it may be required not to display the object to the user of another bidirectional display device, if necessary. In consideration of this, the image output controller 17 can determine the kinds of objects included in an image and can control the positions or sizes of the objects to be displayed in the image in consideration of arrangement of the bidirectional display device in a 3D space together with the kinds of the objects.

Further, as described above, the image output unit 17 can track user's gaze from a first photographed image and a second photographed image and can reconstruct the first image and the second image by reflecting the direction of user's gaze. When reconstructing the first image and the second image, the image output controller 17 can consider arrangement in a 3D space. For example, objects that are included in an image, for example, windows, icons, menus, and pointers of MS Windows usually have rectangular shapes, and it is required to correct the shapes or sizes of objects such that the objects included in images are shown as projection images in a predetermined direction when the bidirectional display device is not disposed toward the front in a 3D space. Accordingly, the image output controller 17 can correct the shapes or sizes of objects and display the objects in consideration of both of arrangement in a 3D space and user's gaze.

The image output controller 17 can correct the shapes or sizes of objects in consideration of user's selection. For example, the image output controller 17 can receive input for whether to correct the shapes or sizes of objects and display the objects in consideration of both of arrangement in a 3D space and user's gaze. When a user inputs an instruction to correct arrangement in 3D space and user's gaze, the image output controller 17 can correct the shapes or sizes of objects and output the objects in consideration of the arrangement in a 3D space and the user's gaze. On the contrary, when a user inputs an instruction not to correct arrangement in a 3D space and user's gaze, the image output controller 17 can display objects included in images without correcting the shapes or sizes of the objects.

In the above embodiment of the present disclosure, it was exemplified that the bidirectional display device and a user exist in the same space and the image output controller 17 corrects images to be output in consideration of arrangement in the same space. The bidirectional display device and a user may exist not in the same space, but at remote positions. The bidirectional display device according to an embodiment of the present disclosure can determine whether the device and a user exist in the same space or at remote positions, and can control images to be output in consideration of the determined result.

For example, the image output controller 17 can provide a user of the bidirectional display device with an environment in which the user can input whether to perform remote connection or whether to use the device in a local area. The image output controller 17 can control operation in an optical see-through mode or a video-based see-through mode on the basis of information input from the user.

That is, when it is determined that the user uses the bidirectional display device in a local area, the image output controller 17 can output a first image and a second image in the optical see-through mode. The optical see-through mode outputs a first image in the first direction and transmits and provides light reflected from subjects, which exist in the second direction, to a user existing in the first direction, and outputs a second image in the second direction and transmits and provides light reflected by subjects, which exist in the first direction, to a user existing in the second direction.

On the other hand, when it is determined that at least one user performs remote connection, the image output controller 17 can output a first image and a second image in the video-based see-through mode. The video-based see-through mode outputs a first image in the first direction, configures an image by collecting light reflected by subjects existing in the second direction, and combines and provides the configured image with the first image to a user, and outputs a second image in the second direction, configures an image by collecting light reflected by subjects existing in the first direction, and combines and provides the configured image with the second image to a user existing in the second direction.

Depending on arrangement of the bidirectional display devices, there may be various users of the bidirectional display devices and it is possible to determine the modes (e.g., the optical see-through mode and the video-based see-through mode) of images to be output and control the images to be output in consideration of the relationship of bidirectional display devices and users. When at least one user performs remote connection, the image output controller 17 can determine arrangement of the bidirectional display device. The image output controller 17 can determine whether there is a user by analyzing a first photographed image or a second photographed image that is obtained through the first image sensor 18 or the second image sensor, and when there is no user, the image output controller 17 can determine that there is no user corresponding to a corresponding display device. The image output controller 17 can match a corresponding area with at least one user who performs remote connection, and can control images to be displayed.

As another example, the image output controller 17 can provide an environment in which the position of at least one user who performs remote connection can be designated, and can receive the position of the at least one user who performs remote connection. The image output controller 17 can control images to be output in consideration of the input position of the user.

Figure 7A:
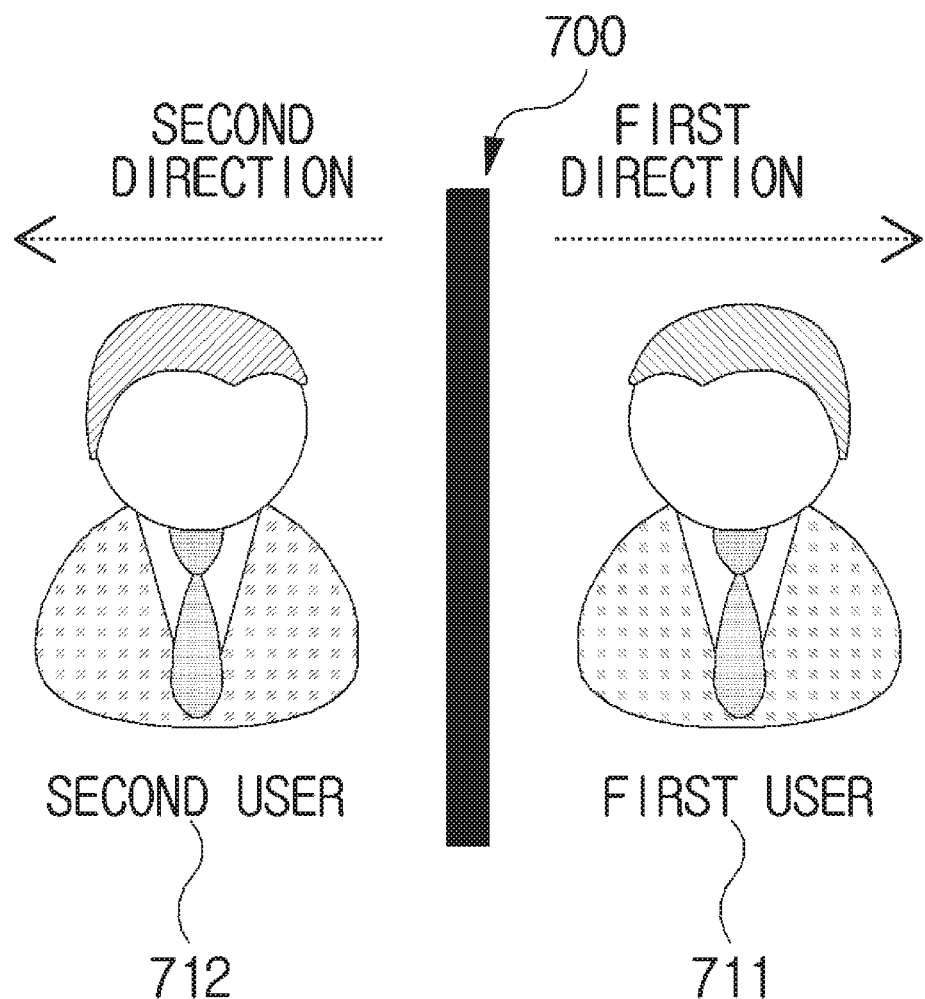
FIGS. 7A and 7B are views exemplifying the relationship between a user and the bidirectional display devices according to an embodiment of the present disclosure.
Figure 7B:
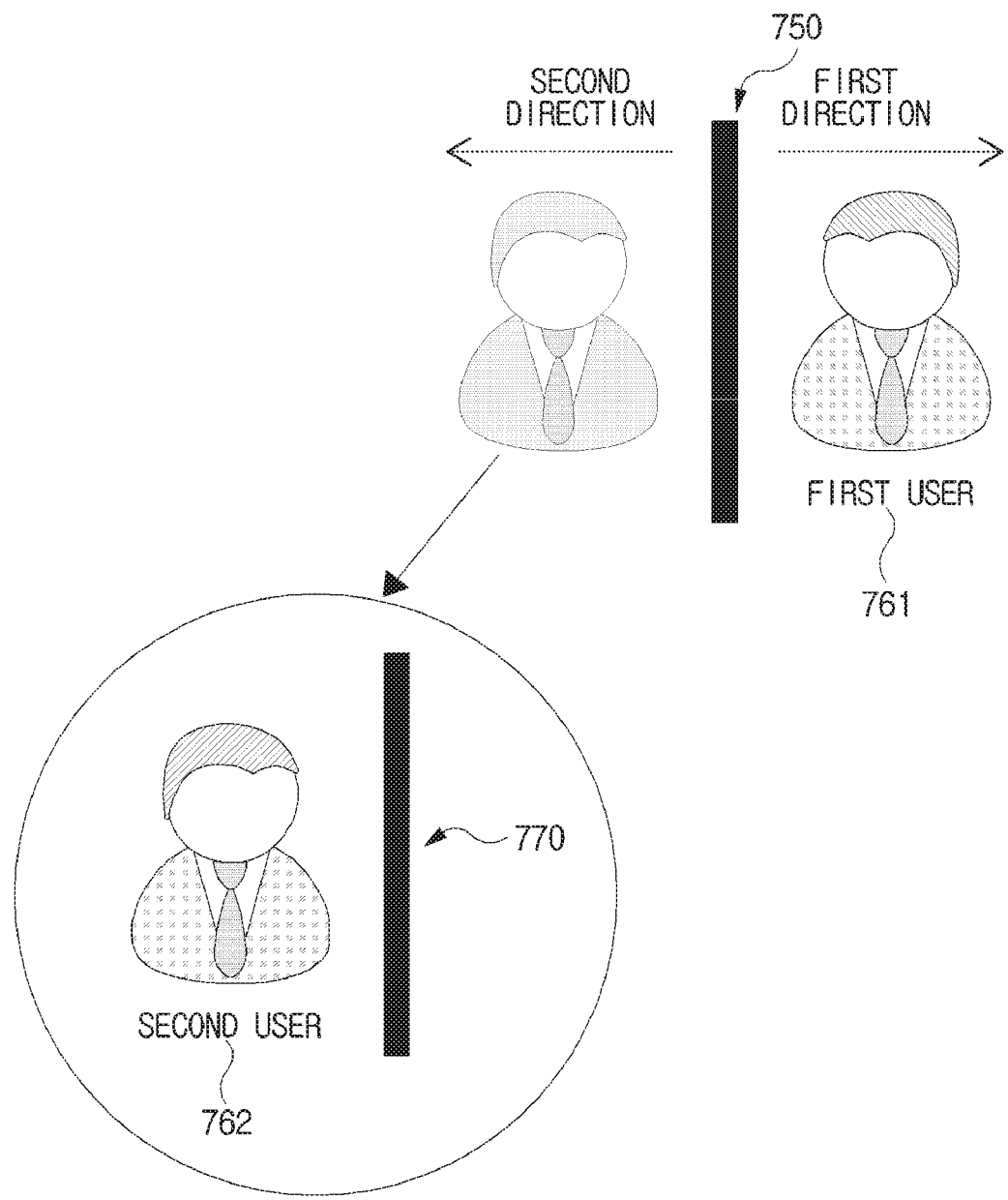

For example, when there is one bidirectional display device, first and second users 711 and 712 may exist at both sides of the bidirectional display device 700 (see FIG. 7A). Both the first and second users 711 and 712 are positioned in a local area with the bidirectional display device 700, the image output controller 17 can be operated in the optical see-through mode. However, when first and second users 761 and 762 (see FIG. 7B) are not positioned in the same space with a bidirectional display device 750, that is, the first user 761 is positioned in the same space with the bidirectional display device and the first user 761 performs remote connection, the image output controller can be operated in the video-based see-through mode. Accordingly, the image output controller 17 outputs a first image in the first direction in which the first user 761 exists without outputting an image in the second direction. Further, it is possible to recognize another display device 770 corresponding to the second user 762 and output a second image configured on the basis of the video-based see-through mode to the display device 770.

Figure 8:
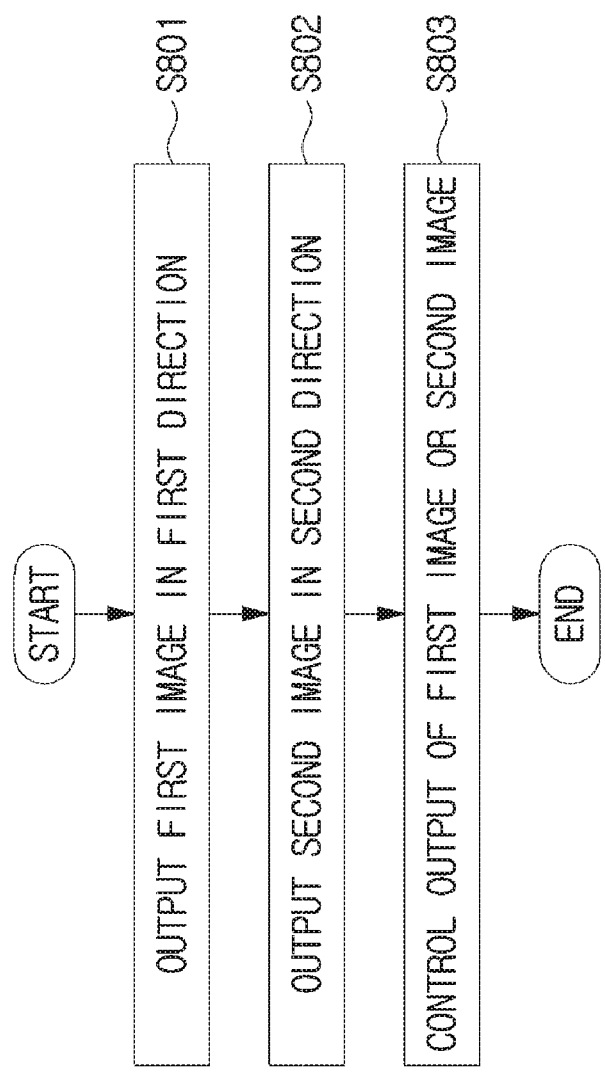
FIG. 8 is a flowchart showing a method of controlling a bidirectional display device according to an embodiment of the present disclosure.

FIG. 8 is a flowchart showing a method of controlling a bidirectional display device according to an embodiment of the present disclosure.

The method of controlling a bidirectional display device according to an embodiment of the present disclosure can be performed by the bidirectional display device described above.

In step S801, a bidirectional display device can transmit and provide light, which is reflected by objects existing in a second direction that is the opposite direction of the first direction, in the first direction while outputting a first image in the first direction. The bidirectional display device can output light corresponding to the first image.

Accordingly, a user can recognize objects existing in the second direction of the bidirectional display device while watching the first image.

Similarly, in step S802, the bidirectional display device can transmit and provide light, which is reflected by objects existing in the first direction, in the second direction while outputting a second image in the second direction. The bidirectional display device can output light corresponding to the second image.

Accordingly, the user can recognize objects existing in the first direction of the bidirectional display device while watching the second image.

In step S803, the bidirectional display device can recognize at least one object included in the first image or the second image and can control transmittance of the object in accordance with the characteristic of the object.

That is, the bidirectional display device can determine the kinds of objects included in the first and second images and can determine transmittance corresponding to the kinds of the objects in consideration of the kinds of the output objects. The bidirectional display device can generate a control signal for controlling the transmittance of areas where the objects exist to fit the determined transmittance.

For example, the bidirectional display device can determine that the kinds of objects included in the first or second image are documents, and can control the transmittance of the area where the objects exist as "0" in accordance with the position and size information of the areas where the objects exist and the kinds of the objects.

When the bidirectional display device sets transmittance as "0", light reflected by objects existing in corresponding areas may not be transmitted, and when transmittance is set as "100", light reflected by objects existing in corresponding areas may be fully transmitted.

The bidirectional display device can determine the kinds of objects included in the first image and the second image and can generate a control signal for controlling output of the areas where the objects exist.

For example, the bidirectional display device can determine that the kinds of objects included in the first and second image are documents, and can provide the position and size information of the areas where the objects exist and the kinds of the objects to the transmittance control panel. Since the kinds of the objects included in the first and second images are documents, the bidirectional display device can control the objects included in the first and second images to be switched.

As another example, the bidirectional display device can determine that the kind of object included in the first or second image is a security document, and can provide the position and size information of the areas where the object exists and the kind of the object to the transmittance control panel. Since the kind of the object included in the first and second images is a security document, the bidirectional display device can control the object to be output in one of the first and second images under certain restrictions.

The bidirectional display device according to an embodiment of the present disclosure may further include at least one first image sensor that photographs in the first direction and at least one second image sensor 19 that photographs in the second direction. Accordingly, the bidirectional display device can control output of the first image and the second image by analyzing a first photographed image and a second photographed image that are taken through the first and second image sensors.

For example, the bidirectional display device can track user's gaze from the first photographed image and the second photographed image and can reconstruct the first image and the second image by reflecting the direction of the user's gaze. In detail, the bidirectional display device can determine parameters (e.g., the photographing direction of a camera device, the resolution of a camera device, the focal distance of a subject, and depth information) related to the photographing environment of the first image, and can reconstruct the first image by re-projecting the image on the basis of geometrical information between the image and the parameters related to the photographing environment. The bidirectional display device can determine the photographing environment of the first photographed image and reconstruct the first image to correspond to the user's gaze.

Similarly, the bidirectional display device can reconstruct and provide the second image in consideration of the photographing environment of the second photographed image and the user's gaze.

The bidirectional display device may include a plurality of light reception elements and light reception waveguides and can determine the intensity of light input through the light reception elements and light reception waveguides. The bidirectional display device can determine whether an object approaches in consideration of arrangement positions of the light reception elements and light reception waveguides.

For example, when an object approaches the first transparent light panel, light output through the light emission waveguide may be reflected by the object and the reflected light may travel into a light reception waveguide. As the light travels into the light reception waveguide, the intensity of the light traveling inside through a light reception element can be determined and the arrangement position of the light reception waveguide connected with the light reception element can be determined. Therefore, the bidirectional display device can determine that an object has approached an area corresponding to the arrangement position of the light reception waveguide, and can estimate the distance from the object on the basis of the intensity of the detected light.

Meanwhile, the bidirectional display device is transparent, so a plurality of users can use images, which are output by the bidirectional display device, at various positions. For example, the bidirectional display devices can be arranged in various ways in consideration of the number of the devices or users arranged, as exemplified in FIGS. 6A to 6E.

The bidirectional display device is required to control display of images or objects to be output in consideration of the arrangement position. To this end, the bidirectional display device according to an embodiment of the present disclosure can determine spatial arrangement and control images to be output in consideration of the spatial arrangement.

In particular, the bidirectional display device can determine position (e.g., X, Y, and Z coordinates) and posture (e.g., pitch, yaw, and roll inclination) information of the bidirectional display device in a 3D space.

The bidirectional display device can support wireless communication and can exchange position information and posture information by communicating with a posture determiner of another bidirectional display device.

For example, when an object included in an image is a document, the bidirectional display device may be required not to display the object to the user of another bidirectional display device, if necessary. In consideration of this, the bidirectional display device can determine the kinds of objects included in an image and can control the positions or sizes of the objects to be displayed in the image in consideration of arrangement of the bidirectional display device in a 3D space together with the kinds of the objects.

For example, as described above, the bidirectional display device can track user's gaze from the first photographed image and the second photographed image and can reconstruct the first image and the second image by reflecting the direction of the user's gaze. When reconstructing the first image and the second image, the bidirectional display device can consider arrangement in a 3D space. For example, objects that are included in images, for example, windows, icons, menus, and pointers of MS Windows usually have rectangular shapes, and it is required to correct the shapes or sizes of objects such that the objects included in images are shown as projection images in a predetermined direction when the bidirectional display device is not disposed toward the front in a 3D space. Accordingly, the bidirectional display device can correct the shapes or sizes of objects and display the objects in consideration of both of arrangement in a 3D space and user's gaze.

Further, the bidirectional display device can correct the shapes or sizes of objects in consideration of user's selection. For example, the bidirectional display device can receive input for whether to correct the shapes or sizes of objects and display the objects in consideration of both of arrangement in a 3D space and user's gaze. When a user inputs an instruction to correct arrangement in 3D space and user's gaze, the bidirectional display device can correct the shapes or sizes of objects and output the objects in consideration of the arrangement in a 3D space and the user's gaze. On the contrary, when a user inputs an instruction not to correct arrangement in a 3D space and user's gaze, the bidirectional display device can display objects included in an image without correcting the shapes or sizes of the objects.

In the above embodiment of the present disclosure, it was exemplified that the bidirectional display device and a user exist in the same space and the bidirectional display device corrects images to be output in consideration of arrangement in the same space. The bidirectional display device and a user may exist not in the same space, but at remote positions. The bidirectional display device according to an embodiment of the present disclosure can determine whether the device and a user exist in the same space or at remote positions, and can control images to be output in consideration of the determined result.

For example, when the bidirectional display device and a user are both positioned in the same space, the bidirectional display device can output the first image and the second image in the optical see-through mode. The optical see-through mode outputs a first image in the first direction and transmits and provides light reflected by subjects, which exist in the second direction, to a user existing in the first direction, and outputs a second image in the second direction and transmits and provides light reflected by subjects, which exist in the first direction, to a user existing in the second direction.

On the other hand, when the bidirectional display device and the user are not positioned in the same space, the bidirectional display device can output the first image and the second image in the video-based see-through mode. The video-based see-through mode outputs a first image in the first direction, configures an image by collecting light reflected by subjects existing in the second direction, and combines and provides the configured image with the first image to a user, and outputs a second image in the second direction, configures an image by collecting light reflected by subjects existing in the first direction, and combines and provides the configured image with the second image to a user existing in the second direction.

Depending on arrangement of the bidirectional display devices, there may be various users of the bidirectional display devices and it is possible to determine the modes (e.g., the optical see-through mode and the video-based see-through mode) of images to be output and control the images to be output in consideration of the relationship of bidirectional display devices and users.

For example, when there is one bidirectional display device, the first and second users 711 and 712 may exist at both sides of the bidirectional display device 700 (see FIG. 7A). Both the first and second users 712 and 712 are positioned in the same space with the bidirectional display device 700, the bidirectional display device can be operated in the optical see-through mode.

On the other hand, when the first and second users 761 and 762 (see FIG. 7B) are not positioned in the same space with the bidirectional display device 750, the bidirectional display device can be operated in the video-based see-through mode. Accordingly, the bidirectional display device outputs a first image in the first direction in which the first user 761 exists without outputting an image in the second direction. Further, it is possible to recognize another display device 770 corresponding to the second user 762 and output a second image configured on the basis of the video-based see-through mode to the display device 770.

Figure 9:
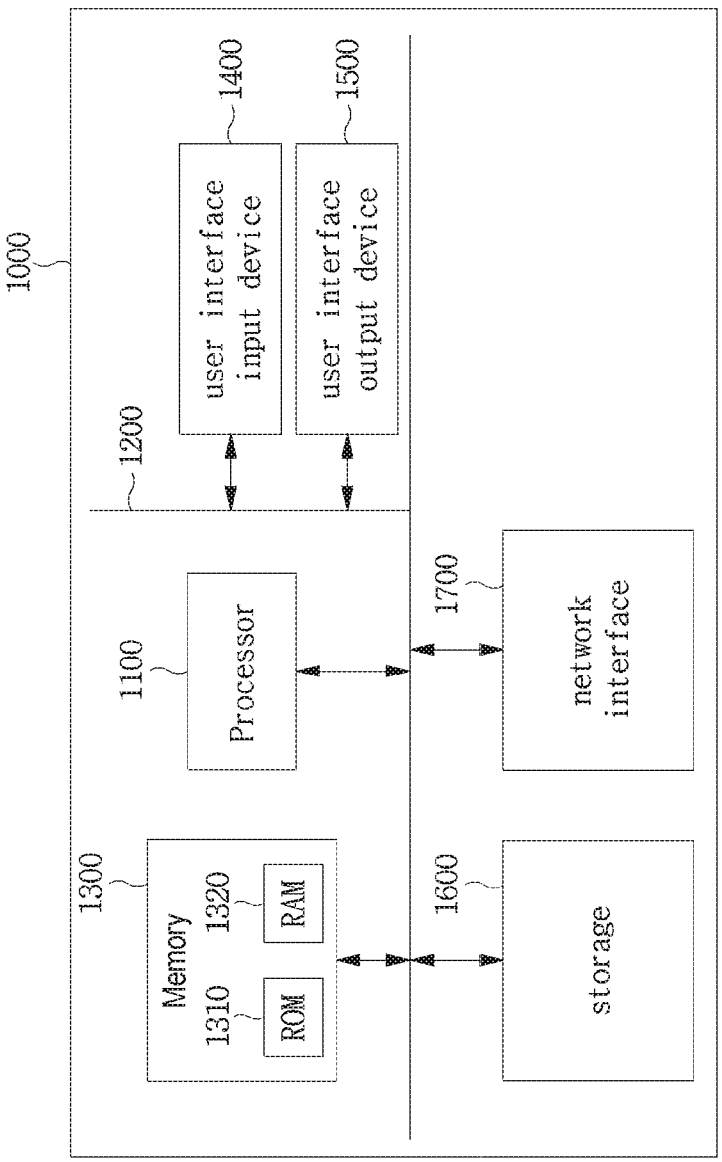
FIG. 9 is a block diagram exemplifying a computing system for implementing the bidirectional display device according to an embodiment of the present disclosure and the method of controlling the bidirectional display device.

FIG. 9 is a block diagram exemplifying a computing system for implementing the bidirectional display device according to an embodiment of the present disclosure and the method of controlling the bidirectional display device.

Referring to FIG. 9, a computing system 1000 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. A bidirectional display device comprising:
a first transparent display panel outputting a first image in a first direction and transmitting light reflected in a second direction that is an opposite direction of the first direction;
a first transparent light panel disposed behind the first transparent display panel and providing light to the first transparent display panel;
a transmittance control panel disposed behind the first transparent light panel;
a second transparent display panel outputting a second image in the second direction and transmitting light reflected in the first direction;
a second transparent light panel disposed between the transmittance control panel and the second transparent display panel and providing light to the second transparent display panel;
a transmittance controller connected to the transmittance control panel and controlling transmittance of at least one object included in the first image or the second image; and
an image output controller controlling output of the first image and the second image, wherein the image output controller determines the kinds of objects included in the first and second images and controls output of areas where the objects exist in consideration of the kinds of the output objects, wherein the transmittance control panel controls the transmittance of images that are output through both the first transparent display panel and the second transparent display panel, wherein the transmittance control panel determines transmittance corresponding to the kinds of the objects and controls transmittance of the areas where the objects exist to fit the determined transmittance, and wherein the image output controller determines that the kinds of the objects included in the first and second image are documents and provides position and size information of the areas where the objects exist, and the kinds of the objects to the transmittance control panel, and controls the objects included in the first and second images to be switched.

2. The bidirectional display device of claim 1, wherein the first transparent light panel includes:
- a plurality of light sources disposed at corners of the panel;
- a light emission waveguide having a structure that delivers light from the light sources to areas corresponding to pixel units of the first transparent display panel;
- a light source controller controlling the light sources to emit light to the areas corresponding to the pixel units of the first transparent display panel.

3. The bidirectional display device of claim 2, wherein the first transparent light panel further includes:
- a plurality of light reception waveguides fixed to respectively correspond to predetermined area units of the first transparent display panel;
- a plurality of light reception elements connected to the light reception waveguides and collecting light from the light reception waveguides; and
- a sensing controller determining intensity of light detected from the light reception elements and determines approach of the object on the basis of the intensity of the light.

4. The bidirectional display device of claim 1, wherein the first transparent light panel includes:
- a first sub-panel including a plurality of light sources corresponding to predetermined cell units and a light emission waveguide, and configuring predetermined first resolution; and
- at least one second sub-panel including a plurality of light sources corresponding to the predetermined cell units and a light emission waveguide, configuring the predetermined first resolution, and adjusted in positions of the predetermined cell units on the basis of a multi-layering method.

5. The bidirectional display device of claim 1, wherein the second transparent light panel includes:
- a plurality of light sources disposed at corners of the panel;
- a light emission waveguide having a structure that delivers light from the light sources to areas corresponding to pixel units of the second transparent display panel;
- a light source controller controlling the light sources to emit light to the areas corresponding to the pixel units of the second transparent display panel.

6. The bidirectional display device of claim 5, wherein the second transparent light panel further includes:
- a plurality of light reception waveguides fixed to respectively correspond to predetermined area units of the second transparent display panel;
- a plurality of light reception elements connected to the light reception waveguides and collecting light from the light reception waveguides; and
- a sensing controller determining intensity of light detected from the light reception elements and determines approach of the object on the basis of the intensity of the light.

7. The bidirectional display device of claim 1, wherein the second transparent light panel includes:
- a third sub-panel including a plurality of light sources corresponding to predetermined cell units and a light emission waveguide, and configuring predetermined first resolution; and
- at least one fourth sub-panel including a plurality of light sources corresponding to the predetermined cell units and a light emission waveguide, configuring predetermined first resolution, and adjusted in positions of the predetermined cell units on the basis of a multi-layering method.

8. The bidirectional display device of claim 1,
further comprising at least one first image sensor photographing in the first direction and at least one second image sensor photographing in the second direction,
wherein the image output controller controls output of the first image and the second image on the basis of images taken by the first image sensor and the second image sensor.

9. The bidirectional display device of claim 8, wherein the image output controller senses user's gaze from the images taken by the first image sensor and the second image sensor, and creates and outputs images of visual points corresponding to the user's gaze.

10. The bidirectional display device of claim 1, wherein the image output controller determines that the kinds of the objects included in the first and second image are security documents and provides position and size information of the areas where the objects exist to the transmittance control panel, and controls output of the objects in one of the first and second images.

11. The bidirectional display device of claim 1, further comprising a space arrangement information manager communicating with another bidirectional display device and determining space arrangement information showing arrangement relationship with the another bidirectional display device.

12. The bidirectional display device of claim 11, wherein the image output controller controls output of the first and second images on the basis of the space arrangement information provided by the space arrangement information manager.

13. A method of controlling a bidirectional display device, the method comprising:
- outputting a first image in a first direction through a first transparent display panel transmitting light reflected in a second direction that is an opposite direction of the first direction, and outputting light in the first direction through a first transparent light panel disposed behind the first transparent display panel;
- outputting a second image in the second direction through a second transparent display panel transmitting light reflected in the first direction, and outputting light in the second direction through a second transparent light panel disposed behind the second transparent display panel; and determining the kind of an object included in the first image or the second image and controlling transmittance of a transmittance control panel disposed between the first and second transparent light panels in response to the kind of the object, wherein the transmittance control panel controls the transmittance of images that are output through both the first transparent display panel and the second transparent display panel, wherein the controlling transmittance of a transmittance control panel comprises:
  controlling output of areas where the objects exist in consideration of the kinds of the output objects,
  determining transmittance corresponding to the kinds of the objects, and
  controlling transmittance of the areas where the objects exist to fit the determined transmittance, and wherein the controlling transmittance of a transmittance control panel comprises:
  determining that the kinds of the objects included in the first and second image are documents,
  providing position and size information of the areas where the objects exist, and the kinds of the objects to the transmittance control panel, and
  controlling the objects included in the first and second images to be switched.

14. The method of claim 13, further comprising:
emitting predetermined light through the first transparent light panel; detecting light collected through a plurality of light reception waveguides and light reception elements fixed to respectively correspond to predetermined area units of the first transparent display panel; and
determining intensity of the detected light and sensing approach of an object in the first direction on the basis of the intensity of the light.

15. The method of claim 13, further comprising:
emitting predetermined light through the second transparent light panel;
detecting light collected through a plurality of light reception waveguides and light reception elements fixed to respectively correspond to predetermined area units of the second transparent display panel; and
determining intensity of the detected light and sensing approach of an object in the second direction on the basis of the intensity of the light.

16. The method of claim 13, further comprising outputting light through a first sub-panel, which includes a plurality of light sources and a light emission waveguide corresponding to predetermined cell units and configures predetermined first resolution, and at least one second sub-panel, which configures the predetermined first resolution and adjusted in positions of the predetermined cell units, and outputting light having second resolution relatively higher than the predetermined first resolution by adjusting light output of the first sub-panel and the second sub-panel on the basis of a multi-layering method.

17. The method of claim 13, further comprising:
communicating with another bidirectional display device and determining space arrangement information showing arrangement relationship with the another bidirectional display device; and
controlling output of the first and second images on the basis of the space arrangement information.

* * * * *